(12) United States Patent
Bakken et al.

(10) Patent No.: US 9,389,701 B2
(45) Date of Patent: Jul. 12, 2016

(54) DATA TRANSFER FROM ACTIVE STYLUS

(75) Inventors: Vemund Kval Bakken, Menlo Park, CA (US); John Logan, Danville, CA (US); Esat Yilmaz, Santa Cruz, CA (US); Kishore Sundara-Rajan, San Jose, CA (US)

(73) Assignee: Atmel Corporation, San Jose, CA (US)

(*) Notice: Subject to any disclaimer, the term of this patent is extended or adjusted under 35 U.S.C. 154(b) by 0 days.

(21) Appl. No.: 13/364,803

(22) Filed: Feb. 2, 2012

(65) Prior Publication Data

US 2013/0106725 A1    May 2, 2013

Related U.S. Application Data

(60) Provisional application No. 61/553,114, filed on Oct. 28, 2011.

(51) Int. Cl.
| | |
|---|---|
| *G06F 3/033* | (2013.01) |
| *G06F 3/038* | (2013.01) |
| *G06F 3/041* | (2006.01) |
| *G06F 3/0488* | (2013.01) |
| *G06F 3/0346* | (2013.01) |
| *G06F 3/0354* | (2013.01) |

(52) U.S. Cl.
CPC ............ *G06F 3/033* (2013.01); *G06F 3/0346* (2013.01); *G06F 3/0383* (2013.01); *G06F 3/03545* (2013.01); *G06F 3/0416* (2013.01); *G06F 3/04883* (2013.01)

(58) Field of Classification Search
CPC ..... G06F 3/03545; G06F 3/044; G06F 21/35; G06F 21/32

USPC ................... 345/179, 173, 174, 175; 178/19.01–19.07
See application file for complete search history.

(56) References Cited

U.S. PATENT DOCUMENTS

| | | | |
|---|---|---|---|
| 4,695,680 A | 9/1987 | Kable | |
| 5,007,085 A * | 4/1991 | Greanias et al. | 726/34 |
| 5,453,762 A * | 9/1995 | Ito et al. | 345/179 |
| 5,699,084 A * | 12/1997 | Fukuzaki | 345/179 |
| 5,883,338 A * | 3/1999 | Trunck et al. | 178/19.07 |
| 5,973,677 A | 10/1999 | Gibbons | |
| 6,556,694 B2 | 4/2003 | Skoog | |
| 6,728,881 B1 * | 4/2004 | Karamchetty | 713/186 |
| 6,894,683 B2 * | 5/2005 | Clapper | G06F 3/03545 |
| | | | 178/19.01 |
| 7,281,135 B2 | 10/2007 | Black | |
| 7,612,767 B1 | 11/2009 | Griffin | |
| 7,663,607 B2 | 2/2010 | Hotelling | |

(Continued)

FOREIGN PATENT DOCUMENTS

WO    WO 2012/129247    9/2012

OTHER PUBLICATIONS

Kyung, Ki-Uk et al., "wUbi-Pen : Windows Graphical User Interface Interacting with Haptic Feedback Stylus," *SIGGRAPH,*, Los Angeles, California, Aug. 2008.

(Continued)

*Primary Examiner* — Thuy Pardo
(74) *Attorney, Agent, or Firm* — Baker Botts L.L.P.

(57) ABSTRACT

In one embodiment, a method includes accessing, by a stylus, data associated with a particular user of the stylus, the data associated with the particular user being stored in a memory of the stylus; and by the stylus, wirelessly transmitting the data to a device in response to the stylus contacting a touch sensor of the device.

20 Claims, 6 Drawing Sheets

(56) References Cited

U.S. PATENT DOCUMENTS

| | | | |
|---|---|---|---|
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2001/0000026 A1* | 3/2001 | Skoog | 382/119 |
| 2008/0238885 A1 | 10/2008 | Zachut | |
| 2008/0309635 A1 | 12/2008 | Matsuo | |
| 2009/0095540 A1 | 4/2009 | Zachut | |
| 2009/0115725 A1 | 5/2009 | Shemesh | |
| 2009/0127005 A1 | 5/2009 | Zachut | |
| 2009/0153152 A1 | 6/2009 | Maharyta | |
| 2009/0184939 A1 | 7/2009 | Wohlstadter | |
| 2009/0207146 A1 | 8/2009 | Shimasaki | |
| 2009/0251434 A1 | 10/2009 | Rimon | |
| 2009/0315854 A1 | 12/2009 | Matsuo | |
| 2010/0006350 A1 | 1/2010 | Elias | |
| 2010/0139992 A1 | 6/2010 | Delia | |
| 2010/0155153 A1 | 6/2010 | Zachut | |
| 2010/0292945 A1 | 11/2010 | Reynolds | |
| 2010/0315384 A1 | 12/2010 | Hargreaves | |
| 2011/0007029 A1 | 1/2011 | Ben-David | |
| 2011/0156867 A1* | 6/2011 | Carrizo et al. | 340/5.85 |
| 2011/0164000 A1* | 7/2011 | Pance | 345/179 |
| 2012/0068964 A1* | 3/2012 | Wright et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0327041 A1 | 12/2012 | Harley | |
| 2013/0076612 A1 | 3/2013 | Myers | |
| 2013/0106719 A1 | 5/2013 | Sundara-Rajan | |
| 2013/0106794 A1* | 5/2013 | Logan | G06F 3/044 345/179 |
| 2014/0085257 A1* | 3/2014 | Wright | G06F 3/03545 345/174 |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

Sundara-Rajan, U.S. Appl. No. 13/356,122, Non-final Office Action, Jul. 31, 2013.

Sundara-Rajan, U.S. Appl. No. 13/356,122, Amendment to Non-final Office Action, Nov. 22, 2013.

Sundara-Rajan, U.S. Appl. No. 13/356,122, Final Office Action, Dec. 30, 2013.

Sundara-Rajan, U.S. Appl. No. 13/356,122, Request for Continued Examination and Amendment, May 30, 2014.

K. Sundara-Rajan, U.S. Appl. No. 13/356,122, Non-final Rejection dated Feb. 20, 2015.

K. Sundara-Rajan, U.S. Appl. No. 13/356,122, Response to Non-final Rejection dated Jun. 22, 2015.

K. Sundara-Rajan, U.S. Appl. No. 13/356,122, Final Rejection dated Aug. 25, 2015.

\* cited by examiner

DATA TRANSFER FROM ACTIVE STYLUS

RELATED APPLICATION

This application claims the benefit, under 35 U.S.C. §119 (e), of U.S. Provisional Patent Application No. 61/553,114, filed 28 Oct. 2011, which is incorporated herein by reference.

TECHNICAL FIELD

This disclosure generally relates to touch sensors.

BACKGROUND

A touch-position sensor, or a touch sensor, may detect the presence and location of an object or the proximity of an object (such as a user's finger or a stylus) within a touch-sensitive area of the touch sensor overlaid, for example, on a display screen. In a touch sensitive display application, the touch position sensor may enable a user to interact directly with what is displayed on the screen, rather than indirectly with a mouse or touch pad. A touch sensor may be attached to or provided as a part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
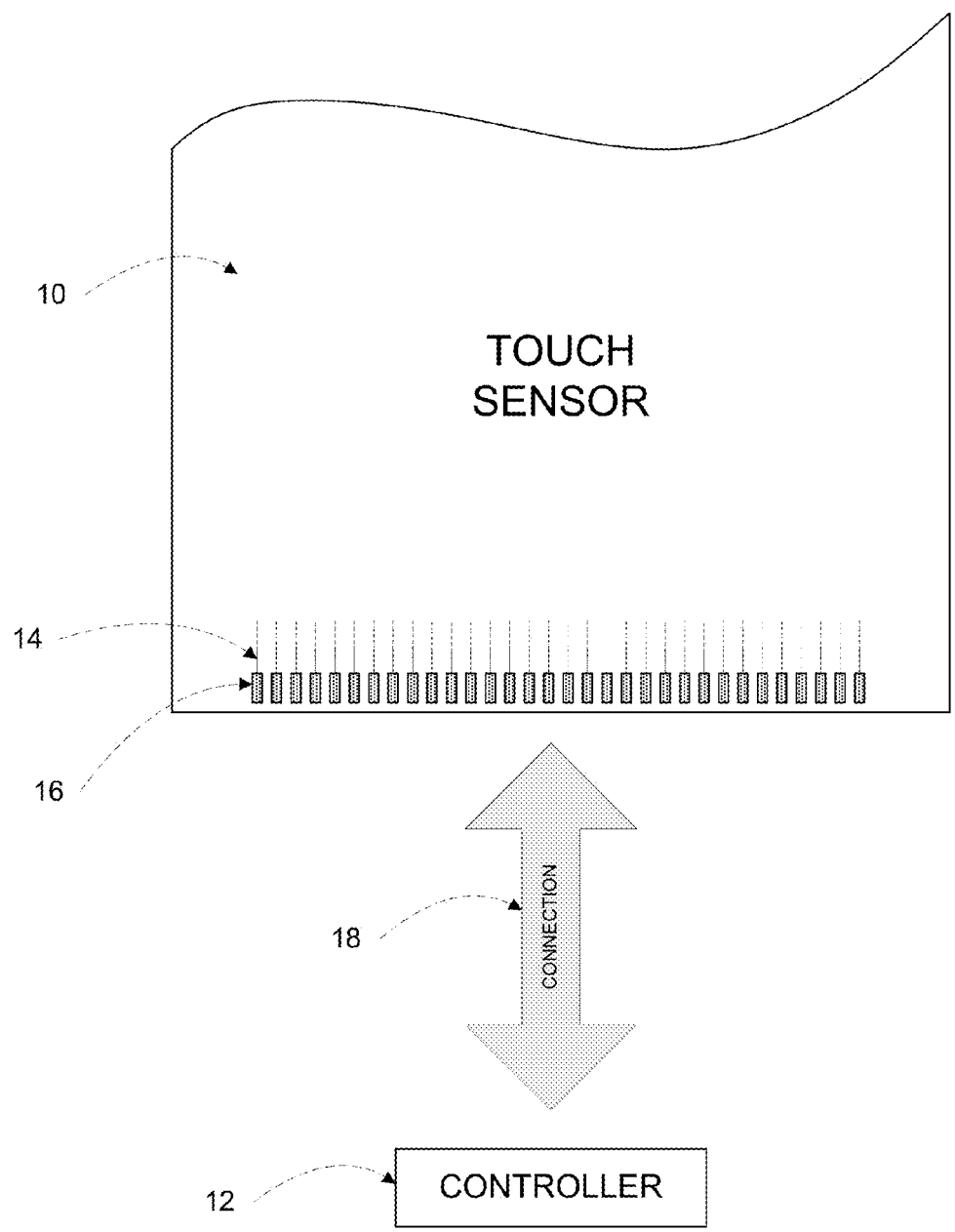
FIG. 1 illustrates an example touch sensor with an example controller.

FIG. 1 illustrates an example touch sensor 10 with an example controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on a FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
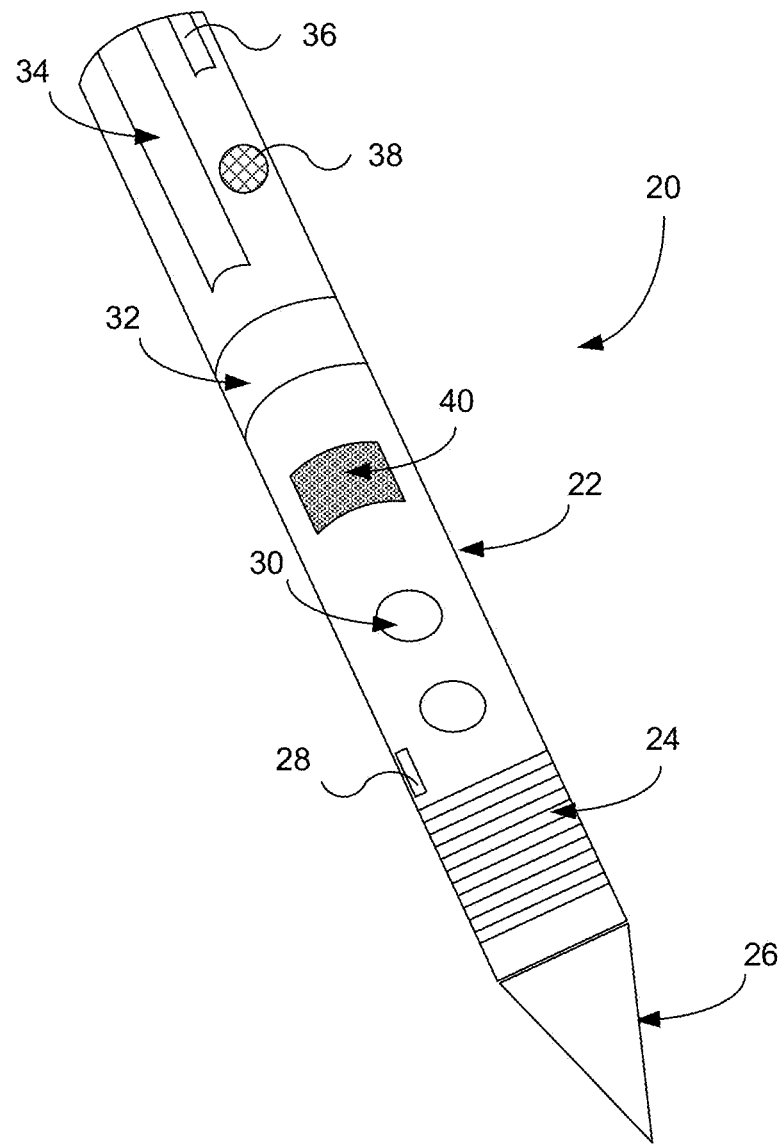
FIG. 2 illustrates an example exterior of an example active stylus.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
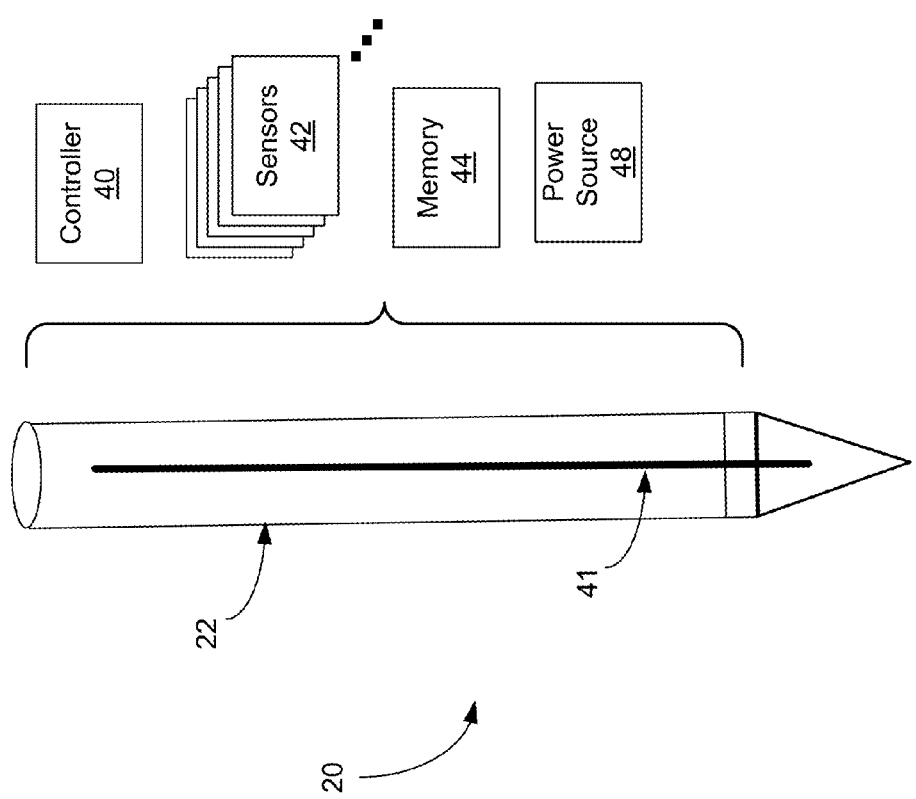
FIG. 3 illustrates an example internal components of example active stylus.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
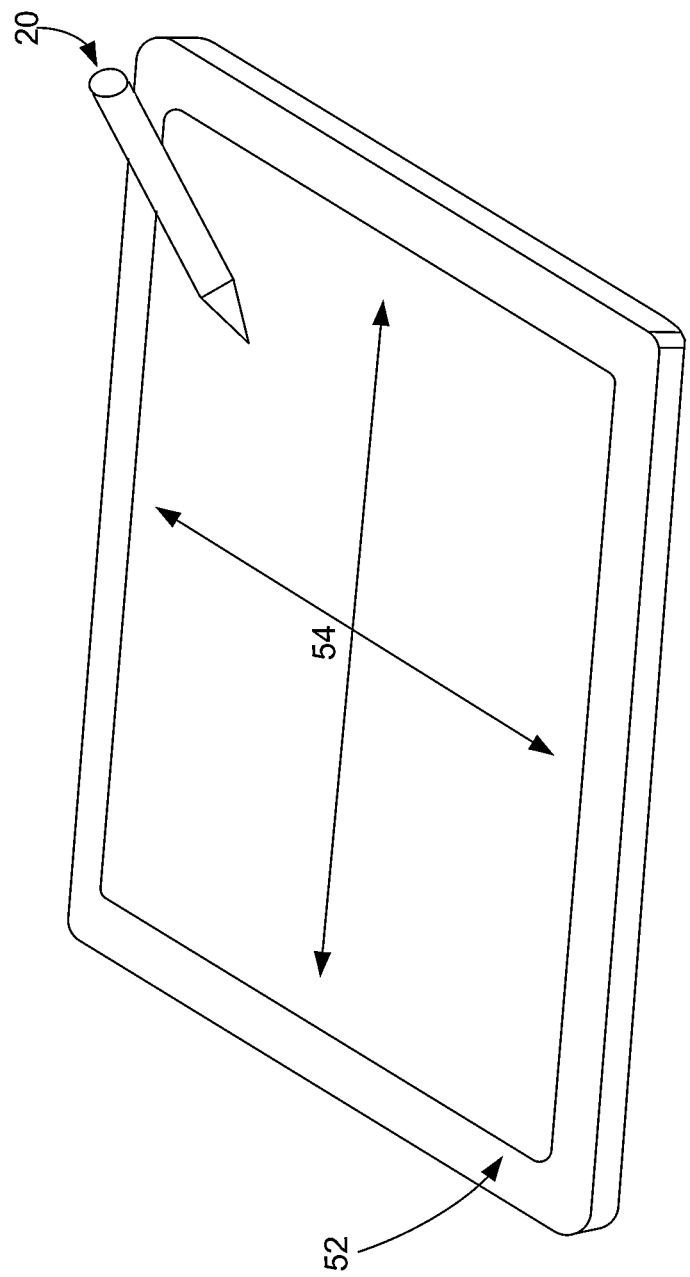
FIG. 4 illustrates an example active stylus with an example device.

FIG. 4 illustrates an example active stylus with an example device. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

As described above, data may be stored in the memory of active stylus 20. In particular embodiments, the data stored in the memory of active stylus 20 may be generated separately from active stylus 20. As an example and not by way of limitation, data associated an application executed on device 52, such as for example, a word processing document or spreadsheet file, may be stored in the memory of active stylus 20. In particular embodiments, data stored in active stylus 20 may be communicated between device 52 and active stylus 20 through a wired connection using data port 28. As an example and not by way of limitation, data associated with the particular user may be uploaded to active stylus 20 through data port 28. In other particular embodiments, data between device 52 and active stylus 20 may be communicated using a wireless communication link. The wireless communication link may include one or more wireless communication protocols—such as for example RF, Bluetooth®, or near-field communication (NFC) communications. Moreover, when active stylus 20 is brought within range of a communication link (e.g. NFC or Bluetooth®) of device 52, active stylus 20 may receive data though the communication link. Although this disclosure describes particular communication protocols for transferring data between the active stylus and a particular device, this disclosure contemplates any suitable communication protocol for data communication between the active stylus and any number of suitable devices.

In particular embodiments, the data stored in memory may be data generated internally by components within active stylus 20. As described above, sensors of active stylus 20 may measure and collect data about the environment in which active stylus 20 operates. As an example and not by way of limitation, motion of a particular user using active stylus 20 is captured by an accelerometer of active stylus 20 and stored in the memory of active stylus 20. In particular embodiments, the accelerometer is able to differentiate between different movements such as for example, running as opposed to walking. The sequence of detected movements may be stored in memory of active stylus 20 for subsequent analysis by a program executed on device 52. As another example, the data captured by the accelerometer may be a movement corresponding to a gesture performed by a particular user manipulating active stylus 20. The particular user holding active stylus 20 may perform a gesture such as for example, a signature outside the detection range of touch-sensitive area 54. The data stored in the memory of active stylus 20 may be subsequently accessed and transferred to device 52 or another device, as described below. Although this disclosure describes transferring particular data between active stylus 20 and a particular device 52, this disclosure contemplates transferring any suitable data between active stylus 20 and any number of suitable devices. Example devices include a smartphone, a PDA, a tablet computer, a laptop computer, a desktop computer, a kiosk computer, a satellite navigation device, a portable media player, a portable game console, a point-of-sale device, a suitable combination of two or more of these, or a suitable portion of one or more of these.

Figure 5:
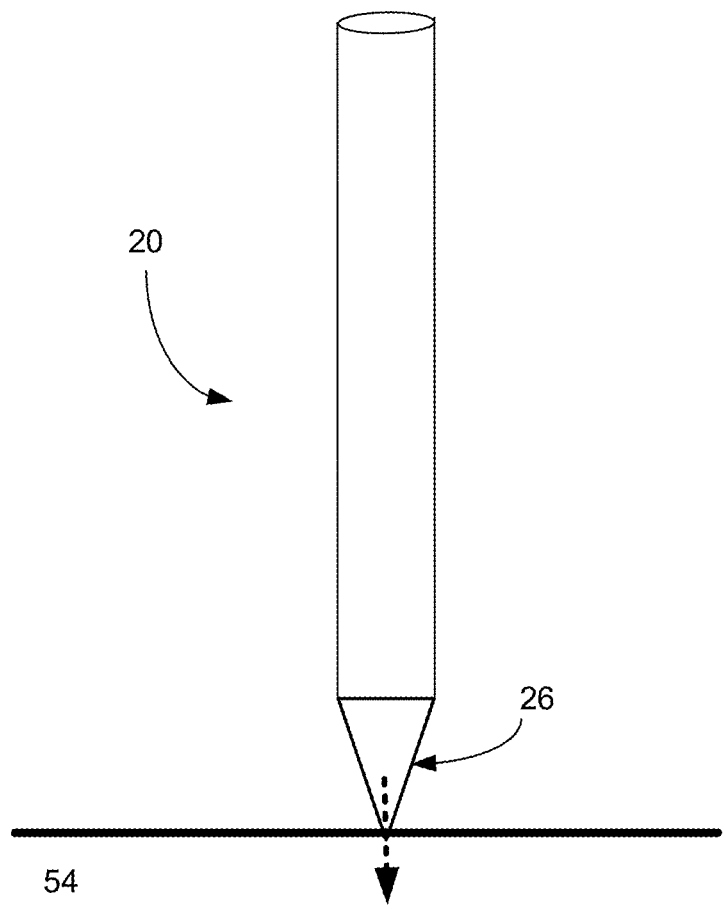
FIG. 5 illustrates contacting the tip of example active stylus with touch-sensitive area of an example device.

FIG. 5 illustrates contacting the tip of example active stylus with touch-sensitive area of an example device. As described above, active stylus 20 may include a force sensor configured to measure a force applied on tip 26 of active stylus 20. As an example and not by way of limitation, the force sensor may be a mechanical force sensor. As another example, the force sensor may be a capacitive force sensor. As described above, active stylus 20 may access data stored in memory 44 and communicate the data to the device. In particular embodiments, touching tip 26 of the active stylus on a touch-sensitive area 54 of the device may initiate a transfer of data stored in a memory of the active stylus to the device. Moreover, the transfer of data is initiated in response to the force applied to tip 26 being above a pre-determined threshold level.

In particular embodiments, authentication of the user may be performed prior to transferring data from active stylus 20 to the device. As an example and not by way of limitation, an authentication procedure may include a gesture performed by the user manipulating active stylus 20. In particular embodiments, the gesture may involve a movement of active stylus 20 by the user, such as for example, a translation of active stylus 20 in any suitable direction or rotation of active stylus 20 about a suitable axis, or any suitable combination of translation and rotation. As an example and not by way of limitation, the authentication procedure may include the user performing a signature in the air, where the movements are captured by the accelerometer of active stylus 20. As described above, based on analysis of the captured movement of the user by the device, the authentication may be validated and the data subsequently transferred from active stylus 20.

In other particular embodiments, gestures may be used in conjunction with other input applied to active stylus 20. As an example and not by way of limitation, sensors of active stylus 20 may capture the grip of the user on active stylus 20 as an input for authentication. As another example, active stylus 20 may include one or more sensors configured to determine the geographic location of active stylus 20, such that if active stylus 20 is in a certain location, such as for example a bank or office associated with the user, active stylus 20 permits transferring of data related to the particular location. Authentication is validated when the active stylus is determined to not be in a location unrelated to the data. Subsequent transfer of data from active stylus 20 to the device is based on analysis of the gesture performed using active stylus 20 and the other input described above.

In particular embodiments, active stylus 20 may be synchronized with the touch sensor of the device prior to the data transfer between active stylus 20 and the device. As described above, the touch sensor of the device may synchronize the transmission of data by active stylus 20 with the drive signal of the touch sensor. Moreover, active stylus 20 may receive and process a pre-determined bit sequence transmitted by electrodes of the touch sensor of the device and synchronizes transmission of data stored in active stylus 20 to the touch-sensor of the device. Data stored in the memory of active stylus 20 is accessed and when active stylus 20 synchronizes with the touch sensor of the device, the data is communicated to the touch sensor of the device. In particular embodiments, the signal transmitted by active stylus 20 modifies the charge stored on capacitive nodes of the touch sensor, as described above. Moreover, the signal transmitted by active stylus 20 modifies the amplitude, frequency, or phase of the signal stored on capacitive nodes of the touch sensor of the device. In particular embodiments, data stored in the memory of active stylus 20 may be transmitted to the device through a wireless communication link, as described above.

In response to receiving the transmitted data, the device may store the data for subsequent use. As described above, data stored in memory of active stylus 20 may be communicated to the device through signals transmitted by active stylus 20. As an example and not by way of limitation, data communicated by active stylus 20 may correspond to movements of the user, as described above. The device may process and analyze the data from the active stylus. A processor of the device may analyze data corresponding to movement of the user to determine patterns of movement of the particular user. As another example, data communicated by the device may correspond to movements of a gesture performed by manipulating active stylus 20, as described above. When the data is communicated to the device, the processor may interpret the data to initiate a function executed by the device. In particular embodiments, the data communicated to the device authenticates the particular user.

Figure 6:
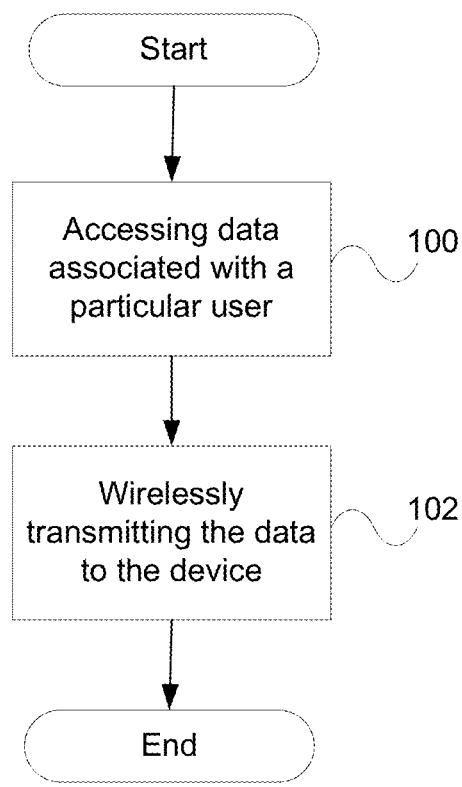
FIG. 6 illustrates an example method for transferring data between a device and an example active stylus of FIG. 3.

FIG. 6 illustrates an example method for transferring data between a device and an active stylus. The method starts at step 100, where data of a device for a particular user is accessed. In particular embodiments, the data associated with the particular user is stored in memory of the active stylus. In other particular embodiments, the data may correspond to a gesture performed by the particular user. At step 102, the stylus wirelessly transmits the data to the device in response to the stylus contacting the touch sensor, at which point the method may end. In particular embodiments, the stylus transmits the data to the device through the touch sensor of the device. In other particular embodiments, transmission of the data uniquely authenticates the particular user. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components carrying out particular steps of the method of FIG. 6, this disclosure contemplates any suitable combination of any suitable components carrying out any suitable steps of the method of FIG. 6.

Herein, reference to a computer-readable non-transitory storage medium may include a semiconductor-based or other IC (such, as for example, a field-programmable gate array (FPGA) or an ASIC, a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   accessing, by a stylus, data associated with a particular user of the stylus, the data associated with the particular user being stored in a memory of the stylus; and
   wirelessly transmitting, by the stylus, the data to a device through a capacitive interaction between the stylus and one or more electrodes of a touch sensor of the device in response to the stylus contacting the touch sensor, wherein the transmission of the data by the stylus is synchronized with a signal received from the device, wherein wirelessly transmitting, by the stylus, the data is initiated in response to a force, measured by a force sensor of the stylus, applied to a tip of the stylus being above a predetermined threshold level.

2. The method of claim 1, further comprising capturing the data associated with the particular user through a sensor of the stylus.

3. The method of claim 2, wherein the data associated with the particular user comprise movements of the particular user captured through the sensor of the stylus.

4. The method of claim 2, wherein:
   the sensor comprises an accelerometer;
   the data associated with the particular user comprises movement of the particular user captured through the accelerometer.

5. The method of claim 1, further comprising capturing an authentication procedure performed using the stylus.

6. The method of claim 5, wherein the authentication procedure comprises a movement of the stylus by the particular user.

7. The method of claim 1, wherein the signal received from the device comprises a predetermined bit sequence, the transmission of the data by the stylus being synchronized with the predetermined bit sequence, the predetermined bit sequence transmitted by at least one of the one or more electrodes through the capacitive interaction with the touch sensor of the device.

8. A device comprising:
   a stylus; and
   a computer-readable non-transitory storage medium coupled to the stylus and embodying logic configured when executed by one or more processors to cause the one or more processors to:
      access, by the stylus, first data associated with a particular user, the first data associated with the particular user being stored in a memory of the stylus and comprising movements of the particular user captured by the stylus through a sensor of the stylus, the movements corresponding to a gesture performed outside a detection range of the touch sensor of the device;
      authenticate, by the stylus, the particular user of the stylus based on the gesture performed outside the detection range of the touch sensor of the device; and
      wirelessly transmit, by the stylus, based on authenticating the particular user by the stylus, second data to a device through a capacitive interaction between the stylus and Fone or more electrodes of a touch sensor of the device in response to the stylus contacting the touch sensor, wherein the transmission of the second data is synchronized with a signal received from the device.

9. The device of claim 8, wherein the logic is further configured to cause the one or more processors to capture the first and second data associated with the particular user through the sensor of the stylus.

10. The device of claim 8, wherein:
    the sensor comprises an accelerometer;
    the first data associated with the particular user comprises movement of the particular user captured through the accelerometer.

11. The device of claim 8, wherein the signal received from the device is received from at least one of the one or more electrodes through the capacitive interaction with the touch sensor, the transmission of the second data being synchronized with the signal received from the at least one of the one or more electrodes through the capacitive interaction with the touch sensor.

12. The device of claim 8, wherein the signal received from the device comprises a predetermined bit sequence, the transmission of the second data by the stylus being synchronized with the predetermined bit sequence, the predetermined bit sequence transmitted by at least one of the one or more electrodes through the capacitive interaction with the touch sensor of the device.

13. The device of claim 8, wherein:
    the first data further reflects a grip of the particular user on the stylus, the grip captured by one or more sensors of the stylus; and
    authenticating, by the stylus, the particular user of the stylus is further based on the grip of the particular user on the stylus.

14. A computer-readable non-transitory storage medium embodying logic configured when executed by one or more processors to cause the one or more processors to:
    access, by a stylus, first data associated with a particular user, the first data associated with the particular user being stored in a memory of the stylus and comprising movements of the particular user captured by the stylus through a sensor of the stylus, the movements corresponding to a gesture performed outside a detection range of the touch sensor of the device;
    authenticate, by the stylus, the particular user of the stylus based on the gesture performed outside the detection range of the touch sensor of the device; and
    wirelessly transmit, by the stylus, based on authenticating the particular user by the stylus, second data to a device through a capacitive interaction between the stylus and one or more electrodes of a touch sensor of the device in response to the stylus contacting the touch sensor, wherein the transmission of the second data is synchronized with a signal received from the device.

15. The medium of claim 14, wherein the logic is further configured to cause the one or more processors to capture the first and second data associated with the particular user through the sensor of the stylus.

16. The medium of claim 14, wherein contacting the touch sensor comprises contacting a tip of the stylus to the touch sensor with a pre-determined amount of force.

17. The medium of claim 14, wherein:
the sensor comprises an accelerometer;
the first data associated with the particular user comprises movement of the particular user captured through the accelerometer.

18. The medium of claim 14, wherein the signal received from the device is received from at least one of the one or more electrodes through the capacitive interaction with the touch sensor, the transmission of the second data being synchronized with the signal received from the at least one of the one or more electrodes through the capacitive interaction with the touch sensor.

19. The medium of claim 14, wherein the signal received from the device comprises a predetermined bit sequence, the transmission of the second data by the stylus being synchronized with the predetermined bit sequence, the predetermined bit sequence transmitted by at least one of the one or more electrodes through the capacitive interaction with the touch sensor of the device.

20. The medium of claim 14, wherein:
the first data further reflects a grip of the particular user on the stylus, the grip captured by one or more sensors of the stylus; and
authenticating, by the stylus, the particular user of the stylus is further based on the grip of the particular user on the stylus.

* * * * *